4/2/85 OR 4,508,429

United States Patent [19]

Nagae et al.

[11] Patent Number: 4,508,429

[45] Date of Patent: Apr. 2, 1985

[54] METHOD FOR DRIVING LIQUID CRYSTAL ELEMENT EMPLOYING FERROELECTRIC LIQUID CRYSTAL

[75] Inventors: Yoshiharu Nagae; Masato Isogai, both of Hitachi; Hideaki Kawakami, Mito; Fumio Nakano, Hitachi, all of Japan

[73] Assignee: Hitachi, Ltd., Tokyo, Japan

[21] Appl. No.: 484,462

[22] Filed: Apr. 13, 1983

[30] Foreign Application Priority Data

Apr. 16, 1982 [JP] Japan ........................ 57-62325

[51] Int. Cl.[3] ........................ G02F 1/13

[52] U.S. Cl. ........................ 350/350 S; 350/332; 350/333

[58] Field of Search ........................ 350/332, 333, 350 S

[56] References Cited

U.S. PATENT DOCUMENTS 4,040,720 8/1977 York ........................ 350/339 R 4,367,924 1/1983 Clark et al. ........................ 350/350 S X

OTHER PUBLICATIONS

Meyer, R. B. "Ferroelectric Liquid Crystals; A Review", *Molecular Crystals & Liq. Crystals*, vol. 40 (1977), pp. 33-48.

Clark, N. A. et al. "Submicrosecond Bistable Electrooptic Switching in Liquid Crystals," *Appl. Phys. Lett.*, vol. 36, No. 11, (Jun. 1980), pp. 899-901.

*Primary Examiner*—John K. Corbin

*Assistant Examiner*—Richard Gallivan

*Attorney, Agent, or Firm*—Antonelli, Terry & Wands

[57] ABSTRACT

A method for driving a liquid crystal element including a ferroelectric liquid crystal sandwiched between a pair of substrates having electrodes on their opposite surfaces is disclosed. A pulse voltage for defining the light transmitting state of the liquid crystal element is applied to the ferroelectric liquid crystal. Before and/or after the application of the pulse voltage, the ferroelectric liquid crystal is applied with a voltage signal which renders the average value of voltages applied to the ferroelectric liquid crystal equal to zero.

9 Claims, 23 Drawing Figures

FIG. 1a
PRIOR ART
FIG. 1b
PRIOR ART
FIG. 1c
PRIOR ART
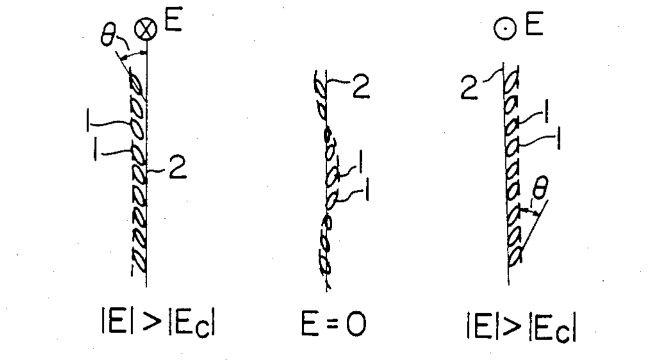
FIG. 2
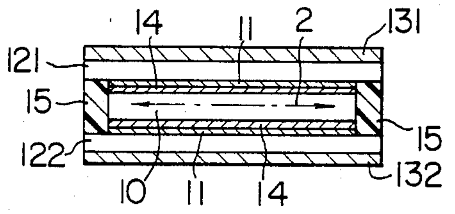
FIG. 3a
FIG. 3b
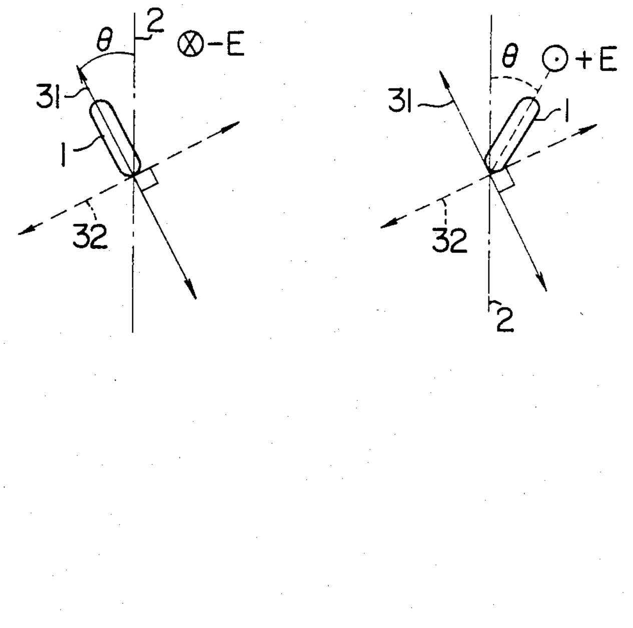

METHOD FOR DRIVING LIQUID CRYSTAL ELEMENT EMPLOYING FERROELECTRIC LIQUID CRYSTAL

BACKGROUND OF THE INVENTION

The present invention relates to a liquid crystal element and in particular relates to a method for driving a liquid crystal element employing a ferroelectric liquid crystal.

As examples of ferroelectric liquid crystals are known liquid crystals exhibiting chiral smectic C-phase (Sm*C) and chiral smectic H-phase (Sm*C) as shown in Table 1.

TABLE 1

(n: integer)

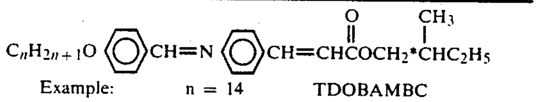

| Example: | n = 14 | TDOBAMBC |
|---|---|---|
| | n = 12 | DDOBAMBC |
| | n = 10 | DOBAMBC |
| | n = 8 | OOBAMBC |
| | n = 6 | HOBAMBC |

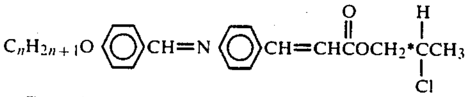

| Example: | n = 6 | HOBACPC |
|---|---|---|
| | n = 8 | OOBACPC |
| | n = 10 | DOBACPC |

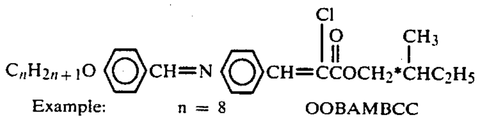

| Example: | n = 8 | OOBAMBCC |
|---|---|---|

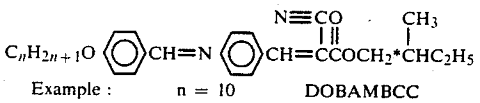

| Example : | n = 10 | DOBAMBCC |
|---|---|---|

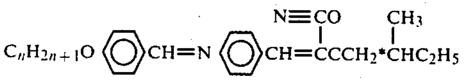

| Example: | n = 14 | TDOBAMBCC |
|---|---|---|

States of these ferroelectric liquid crystal molecules when subjected to an electric field are described in Neol A. Clark et al: "Submicrosecond bistable electro-optic switching in liquid crystals", Appl. Phys. Lett. Vol. 36, No. 11, June 1980, p.p. 899 to 901, for example. FIG. 1*a* to FIG. 1*c* show these states.

As shown in FIG. 1*b*, when an electric field E is not applied, ferroelectric liquid crystal molecules 1 are helically oriented at an angle $\theta$ to the axis of helix 2. The angle $\theta$ is 20° to 25°, for example, in the case of DOBAMBC.

As shown in FIG. 1*a*, when an electric field E exceeding the threshold electric field $E_C$ is applied to the ferroelectric liquid crystal molecules 1 thus oriented, the molecules 1 are aligned on a plane perpendicular to the direction of the electric field E with each long molecular axis having an angle $\theta$ with respect to the helix axis 2. When the polarity of the electric field E is reversed as shown in FIG. 1*c*, the ferroelectric liquid crystal molecules 1 are reversely aligned on the plane perpendicular to the direction of the electric field E with each long molecular axis having an angle $\theta$ to the helix axis 2.

This phenomenon takes place at fast speed. It is known that ferroelectric liquid crystal molecules may respond to a voltage pulse having a pulse width in the order of microsecond if an electric field of sufficient magnitude is applied to the molecules. Accordingly, it is expected to use ferroelectric liquid crystals to a large-sized display having a number of pixels (picture elements), optical shutter, polarizer and so on. Heretofore, however, the relationship between applied voltage and light transmitting state has not been made clear. In addition, a practical voltage suitable to drive the ferroelectric liquid crystals was also unclear.

SUMMARY OF THE INVENTION

An object of the present invention is to provide a method for driving a liquid crystal element employing a ferroelectric liquid crystal, in which deterioration of the ferroelectric liquid crystal is prevented and a desired light transmitting state can be rapidly attained. The invention is based on the relationship between an applied voltage and the light transmitting state of a ferroelectric liquid crystal which has been found by the present inventors.

According to the present invention, there is provided a method for driving a liquid crystal element including a ferroelectric liquid crystal interposed between a pair of substrates which have electrodes on their confronting surfaces, said method comprising, a first step of applying to said ferroelectric liquid crystal a pulse voltage which defines the light transmitting state of said liquid crystal element, and a second step of applying to said ferroelectric liquid crystal before and/or after said first step a voltage signal which renders the average value of voltages applied to said ferroelectric liquid crystal equal to zero.

BRIEF DESCRIPTION OF THE DRAWINGS

The present invention will now be described in conjunction with the accompanying drawings, in which:

FIGS. 1*a* to 1*c* illustrate states of ferroelectric liquid crystals with respect to applied electric fields;

FIG. 2 shows the sectional view of an example of a liquid crystal element to which the present invention may be applied;

FIGS. 3*a* and 3*b* illustrate the relationship between the direction of the helix axis of ferroelectric liquid crystal molecules and the polarization directions of polarizers;

DETAILED DESCRIPTION OF THE INVENTION

Figure 4:
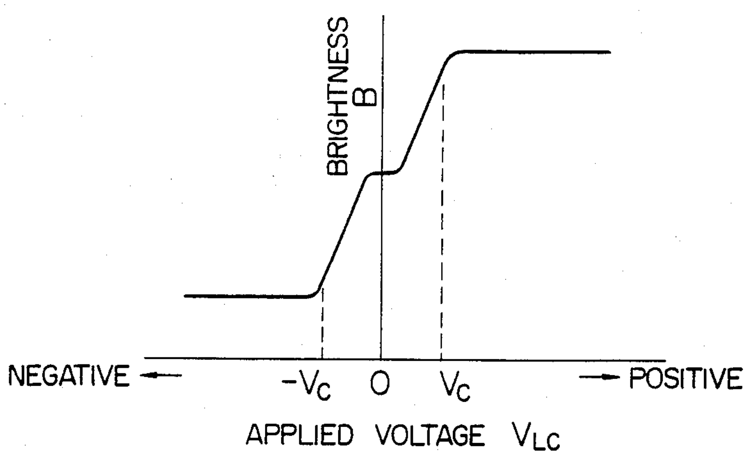
FIG. 4 shows an example of light transmitting characteristics of a ferroelectric liquid crystal to which the present invention may be applied.

The present invention is based on the under-mentioned experimental facts which have been found by the present inventors.

As shown in FIG. 2, a transparent electrode having the thickness of 500 to 1000 Å composed of $In_2O_3$ or $SnO_2$, or the combination thereof or the like is provided on the confronting faces of a pair of substrates 121 and 122 composed of glass, plastic or the like. In addition, an orientating film 14 having the thickness of 100 to 1000 Å composed of an organic resin, $SiO_2$ or the like is provided as occasion demands. The DOBAMBC 10 which is one of ferroelectric liquid crystals, is inserted into the gap of approximately 10 μm between the substrates 121 and 122 at 73° to 90° C. where the DOBAMBC 10 takes the chiral smectic C phase exhibiting ferroelectricity. Numeral 15 denotes a sealing agent for sealing the DOBAMBC 10. The orientating film 14 has been subjected to orientating process so that the helix axis 2 of the ferroelectric liquid crystal molecules may be approximately parallel to the substrates 121 and 122. In addition, polarizers 131 and 132 are placed adjacent to the faces other than those provided with the transparent electrodes 11 of the substrates 121 and 122. The overlapped portion of the upper and lower transparent electrodes 11 forms a light transmitting portion and forms a picture element in the case of a display element.

As shown in FIG. 3, the polarization direction 31 of the polarizer 131 is crossed to the polarization direction 32 of the polarizer 132. In addition, the polarization direction of one of the polarizers is so placed as to nearly coincide with the direction of the long axis of the ferroelectric liquid crystal molecules 1 when an electric field exceeding the threshold electric field $|E_C|$ of the ferroelectric liquid crystal is applied. In FIGS. 3a and 3b, the polarization direction 31 of the polarizer 131 is so placed as to coincide with the direction of the long axis of the ferroelectric liquid crystal molecules 1 when an electric field is applied in the downward direction normal to the paper. Hereafter, an electric field in this direction is represented as $-E$ by adding the minus sign. In addition, description will be made referring to a liquid crystal element having the structure illustrated in FIG. 2 as an example. However, the present invention is not limited to such an element. For example, the present invention may be applied to the case where dichroic dye composed of a mixture of one or more kinds including anthraquinone derivative, azo derivative, diazo derivative, merocyanine derivative, tetrazine derivative is mixed into the ferroelectric liquid crystal 10 in FIG. 2. In this case, it is permitted not to use the polarizer 132. In addition, a reflector may be placed adjacent to the substrate 122 instead of the polarizer 132. Further, in this case, an optimum orientation angle θ of the ferroelectric liquid crystal molecule to the helix axis is 45°.

In FIG. 3a, an electric field of $-E$ is applied to the ferroelectric liquid crystal molecule. At this time, the light (natural light) incident in the direction normal to the paper from the front side is polarized in the polarization direction 31 by the upper polarizer 131 to yield linearly-polarized light having an oscillation component only in the long axis direction of the ferroelectric liquid crystal molecule 1. The light transmits through the liquid crystal layer 10 as the linearly-polarized light in accordance with the refractive index $n_{||}$ in the long axis direction.

Thereafter, the light reaches the lower polarizer 132. Since the polarization direction 32 of this polarizer 132 is perpendicular to the polarization direction 31 of the polarizer 131, the light is interrupted so that dark appearance is exhibited in the display element.

In FIG. 3b, an electric field of $+E$ is applied. In this case, the long axis of the ferroelectric liquid crystal molecule 1 coincides with neither the polarization axis 31 of the upper polarizer 131 nor the polarization axis 32 of the lower polarizer 132. Among the linearly-polarized light obtained by the upper polarizer 131, a light component in the long axis direction of the ferroelectric liquid crystal molecule passes through the liquid crystal layer 10 with its refractive index $n_{||}$ in the long axis direction and a light component in the short axis passes through the layer 10 with its refractive index $n_{\perp}$ in the short axis direction. Accordingly, the light passed through the liquid crystal layer 10 becomes elliptically-polarized light. Since the elliptically-polarized light includes a light component passing through the lower polarizer 132, there looks bright in the case of a display element.

In this way, a switching between the bright and dark states can be effected by the application of $+E$ or $-E$. Thus, the liquid crystal element can serve as a display element, an optical shutter or a polarizer element. When no electric field is applied, the liquid crystal element exhibits a nearly intermediate level of brightness between the bright and dark states. These phenomena will be hereafter referred to as "electro-optical effect of ferroelectric liquid crystal". Taking a display element as an example, the effect will be described in the following.

The present inventor's investigation of this electro-optical effect has revealed its characteristics as shown in FIG. 4. That is to say, as a voltage $V_{LC}$ applied to the ferroelectric liquid crystal is increased from zero volts, the brightness B increases. When the voltage exceeds the threshold voltage $+V_C$, the brightness B assumes a constant value. In the same way, the brightness B decreases as the applied voltage is increased in its negative direction. When the applied voltage exceeds the threshold voltage $-V_C$, the brightness assumes a lower constant value.

Figure 5A:
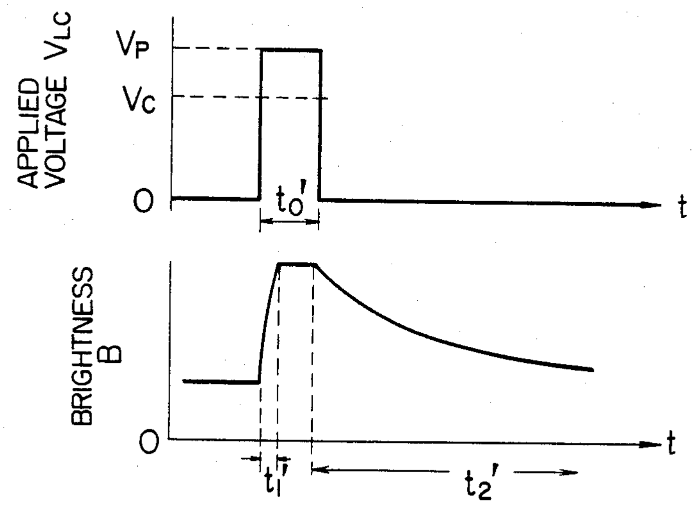
FIGS. 5*a* and 5*b* illustrate the response of the light transmitting state of a ferroelectric liquid crystal for a pulse voltage to which the present invention may be applied.

Succeedingly, for the purpose of investigating the response of the ferroelectric liquid crystal to a pulse voltage $V_P$, a positive voltage pulse $V_P$ having a peak value which is larger than the threshold voltage $V_C$ as shown in FIG. 5a has been applied to the ferroelectric liquid crystal. Then, it has been revealed that the brightness B rapidly increases with a short rise time $t_1'$ just after the application of the pulse voltage $V_P$ while the recovery time $t_2'$ after the removal of the pulse voltage $V_P$ is long as illustrated in FIG. 5a.

For example, the present inventors have experimentally ascertained $t_1'=120$ μs and $t_2'=8$ ms when a pulse voltage $V_P$ having the peak value of 15 V higher than the threshold voltage of 5 to 10 V and the pulse width of $t_o'=500$ μs is applied to the ferroelectric liquid crystal.

Figure 5B:
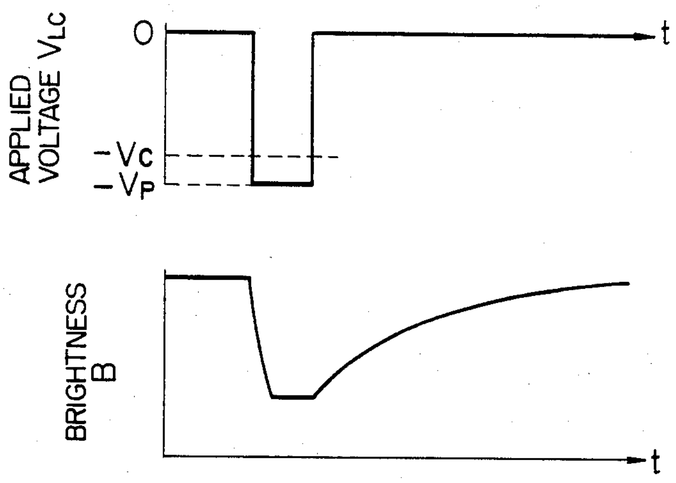

Also for the response to a negative pulse voltage $-V_P$, it has been found that as shown in FIG. 5*b*, the response to the removal of the pulse voltage is slow as compared with that to the application of the pulse voltage, thereby resulting in a long recovery time.

Figure 6A:
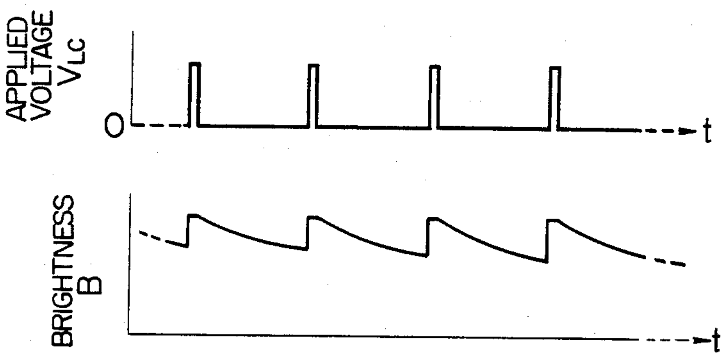
FIGS. 6*a* and 6*b* illustrate the response of the light transmitting state for pulse voltage trains.
Figure 6B:
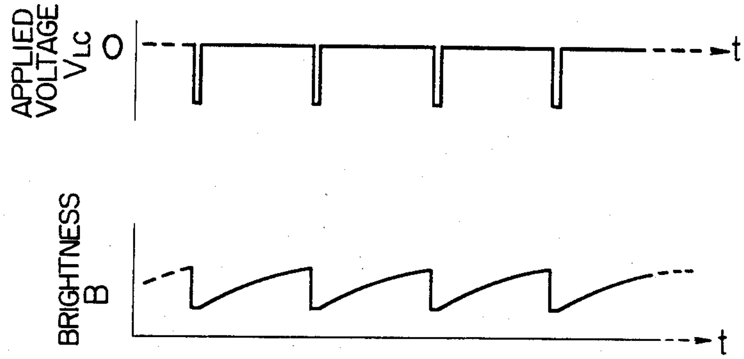

When pulse voltage trains as shown in FIGS. 6*a* and 6*b* are applied to the ferroelectric liquid crystal, the average brightness brought about by the positive pulse train illustrated in FIG. 6*a* is largely different from that brought about by the negative pulse train illustrated in FIG. 6*b*. Therefore, it is possible to establish two light transmitting states, i.e. the bright state and the dark state.

For obtaining a favorable display by such a method, the repetition period of the pulse voltages applied to the ferroelectric liquid crystal must be 30 ms or less to be free of display flicker.

In such a driving method, however, unless the duration of bright display state is equal to that of dark display state in a display section, the voltage $V_{LC}$ applied to the ferroelectric liquid crystal will include a DC component. In extreme cases, a positive DC component is always applied to picture element taking always the bright display state while a negative DC component is always applied to a picture element taking always the dark display state.

It is well known that when a DC component is applied to a liquid crystal element during the driving thereof, the deterioration of the element is accelerated because of an electrochemical reaction, thereby resulting in a reduced life. Thus, the method illustrated in FIG. 6 provides a serious drawback in respect of the life of the liquid crystal element.

EMBODIMENT 1

FIG. 7 shows driving waveforms according to a first embodiment of the present invention, wherein immediately before the pulse voltage $V_P$ illustrated in FIG. 6, a pulse voltage $-V_P$ of opposite polarity having the same pulse width and pulse height as the pulse voltage $V_P$ is applied.

Figure 7A:
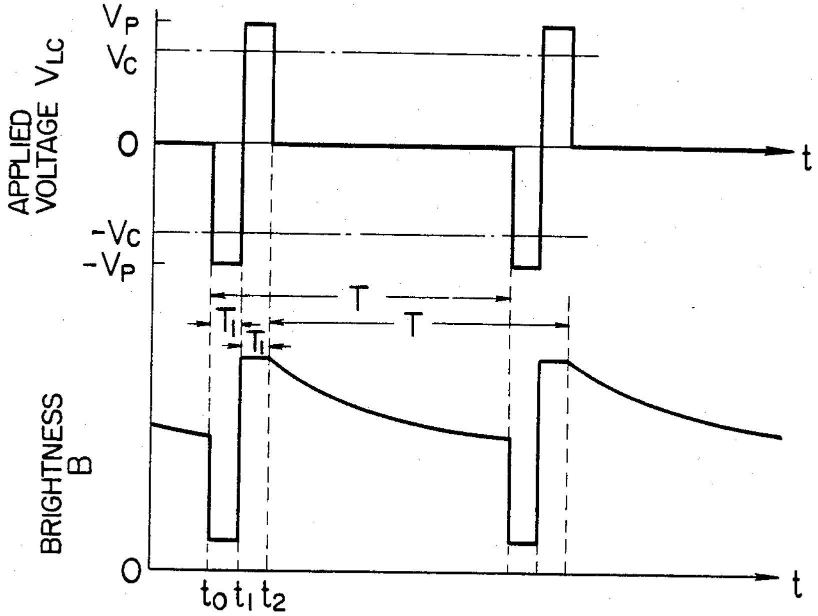
FIGS. 7*a* and 7*b* illustrate driving waveforms in accordance with to a first embodiment of the present invention.
Figure 7B:
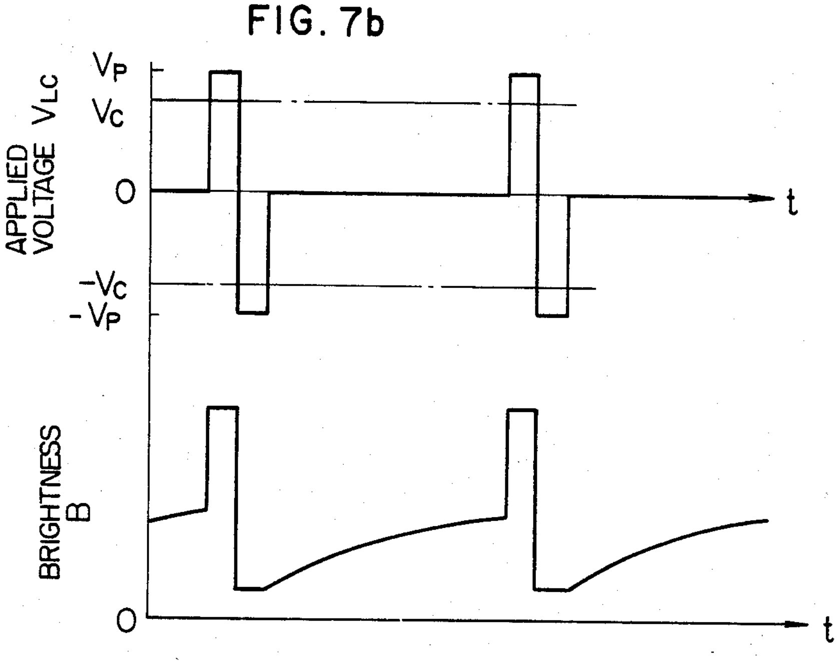

FIG. 7*a* shows the relationship between the voltage $V_{LC}$ applied to the ferroelectric liquid crystal (which transmits the incident light, i.e. presents bright display in the case of a display element) and the light transmitting state (brightness B) of the liquid crystal element illustrated in FIG. 2. FIG. 7*b* shows the relationship between the applied voltage $V_{LC}$ and the brightness B when the incident light is interrupted, i.e. dark display is effected in the case of a display element.

Referring to FIG. 7*a*, when a negative pulse voltage with a peak value $-V_P$ (5 to 20 V) and a pulse width $T_1$ (500 to 1000 μs) is applied to the ferroelectric liquid crystal at time $t_o$, the brightness once becomes dark. However, by the application of a positive pulse voltage with the peak value $V_P$ and the pulse width $T_1$ at time $t_1$, the liquid crystal abruptly exhibits dark appearance. After the applied voltage is removed at time $t_2$, the brightness is gradually decreased. By repeating such an operation with such a predetermined period (1 to 30 ms) at which flicker is prevented, it is possible to obtain sufficiently high average brightness.

Since the pulse voltage $-V_P$ having an opposite polarity but the same absolute value as compared with the pulse voltage $V_P$ for defining the light transmitting state is applied to the ferroelectric liquid crystal within the predetermined period T, the average value of voltages applied to the ferroelectric liquid crystal becomes zero. Because of complete absence of any DC component, the deterioration of ferroelectric liquid crystal due to the electrochemical reaction is not incurred.

Further, in the present embodiment, just before the application of the pulse voltage $V_P$ which defines the light transmitting state, the pulse voltage $-V_P$ is applied which has an opposite polarity and the same pulse width and pulse height as compared with the pulse voltage $V_P$. As shown in FIG. 7*b*, therefore, it is possible to obtain a light intercepting state by merely inverting the polarity of the pulse voltage.

Figure 8:
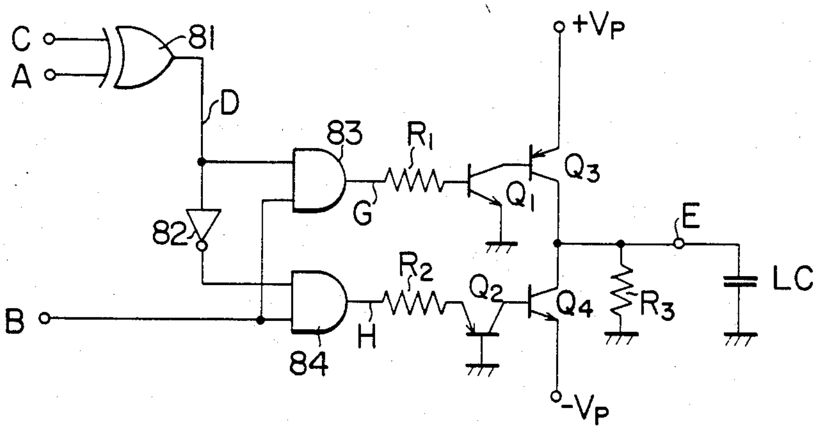
FIG. 8 illustrates an example of practical circuit for realizing the driving waveform illustrated in FIGS. 7*a* and 7*b;*

FIG. 8 shows an example of practical circuit for realizing the driving waveform illustrated in FIG. 7.

In FIG. 8, numeral 81 denotes an exclusive OR gate, 82 an inverter, 83 and 84 AND gates, $Q_1$, $Q_2$, $Q_3$ and $Q_4$ switching transistors, $R_1$, $R_2$ and $R_3$ resistors, A, B and C input terminals. E an output terminal, and LC denotes a liquid crystal element connected to the output terminal E.

Figure 9:
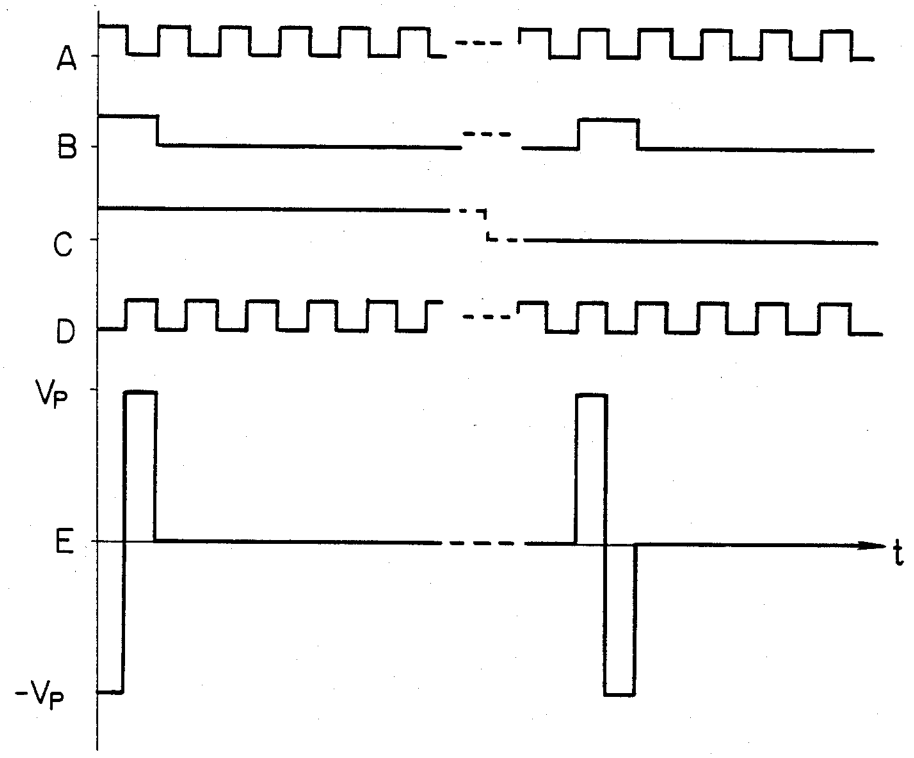
FIG. 9 shows time charts for respective signals appearing in the circuit illustrated in FIG. 8.

Table 2 shows the output voltage E for respective combinations of signals appearing in the circuit shown in FIG. 8. FIG. 9 shows respective signal waveforms.

TABLE 2

| A | B | C | D | G | H | Output Voltage E |
|---|---|---|---|---|---|---|
| 0 | 0 | 0 | 0 | 0 | 0 | 0 |
| 0 | 1 | 0 | 0 | 0 | 1 | $-V_P$ |
| 1 | 0 | 0 | 1 | 0 | 0 | 0 |
| 1 | 1 | 0 | 1 | 1 | 0 | $+V_P$ |
| 0 | 0 | 1 | 1 | 0 | 0 | 0 |
| 0 | 1 | 1 | 1 | 1 | 0 | $+V_P$ |
| 1 | 0 | 1 | 0 | 0 | 0 | 0 |
| 1 | 1 | 1 | 0 | 0 | 1 | $-V_P$ |

The signal A defines the pulse width, the signal B defines the timing at which the pulse voltage is outputted, and the signal C defines the phase of the output voltage E. It is possible to define the light transmitting state by controlling the signal C.

EMBODIMENT 2

Figure 10A:
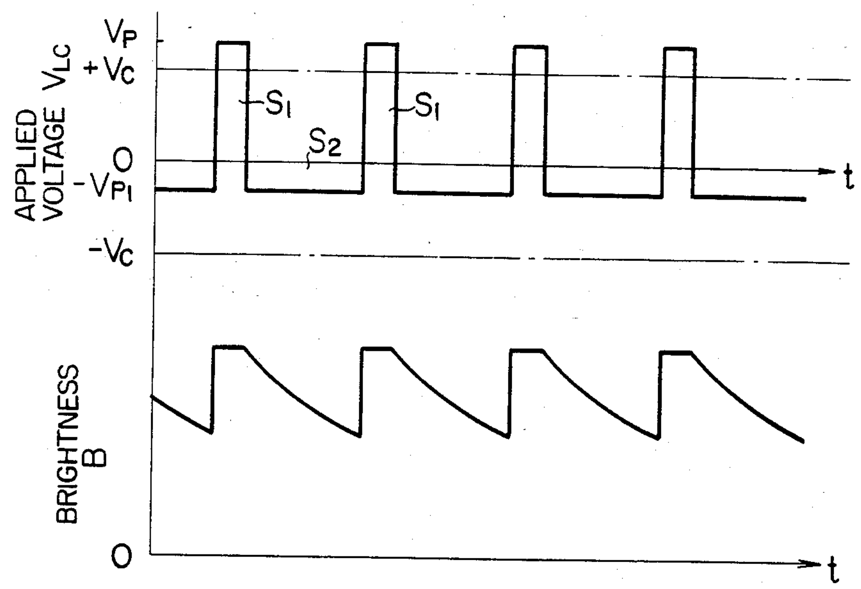
FIGS. 10a and 10b illustrate driving waveforms in accordance with a second embodiment of the present invention.
Figure 10B:
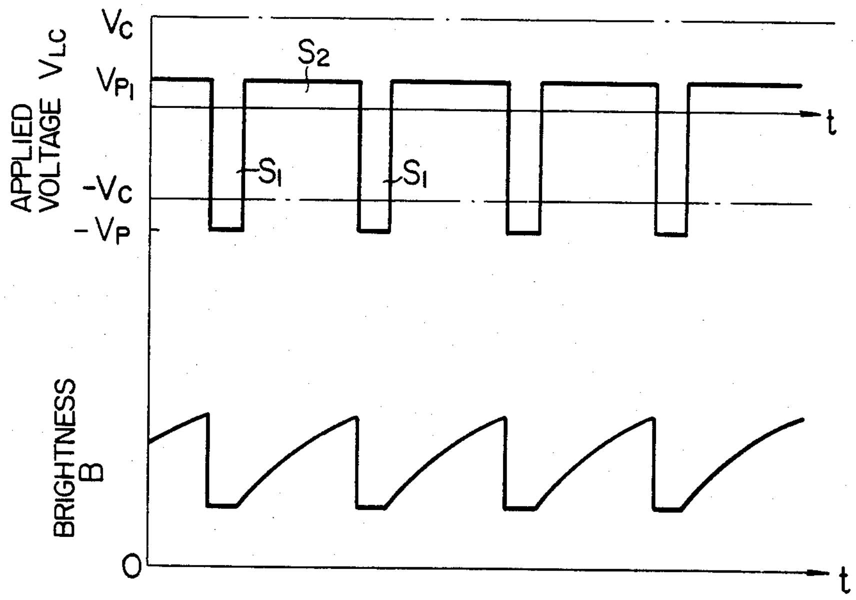

FIG. 10 shows driving waveforms according to a second embodiment of the present invention. FIGS. 10*a* and 10*b* correspond to the bright display and the dark display, respectively.

The difference of the present invention from the first embodiment illustrated in FIG. 7 is that the pulse hight $V_{P1}$ of the pulse voltage of opposite polarity which to be applied in order to suppress the DC component in the voltage applied to ferroelectric liquid crystal is chosen to be smaller than the threshold voltage $V_C$ and the pulse width of the pulse voltage of opposite polarity is correspondingly expanded. In order to eliminate the DC component, the DC component $S_1$ of the positive pulse must have the same absolute value as the DC component $S_2$ of the negative pulse as represented by equation (1).

$$S_1=-S_2 \quad (1)$$

In this embodiment as well, the average value of voltages applied to the ferroelectric liquid crystal becomes zero. Thus, there exists no DC component. Accordingly, deterioration of the ferroelectric liquid crystal is not incurred. In addition, a desired light transmitting state can be rapidly obtained.

Further, in this embodiment, the peak value of the pulse voltage for suppressing the DC component is smaller than the threshold voltage $V_C$ the ferroelectric liquid crystal. Therefore, the contrast ratio obtained in this embodiment is larger than that obtained in the first embodiment.

EMBODIMENT 3

Figure 11A:
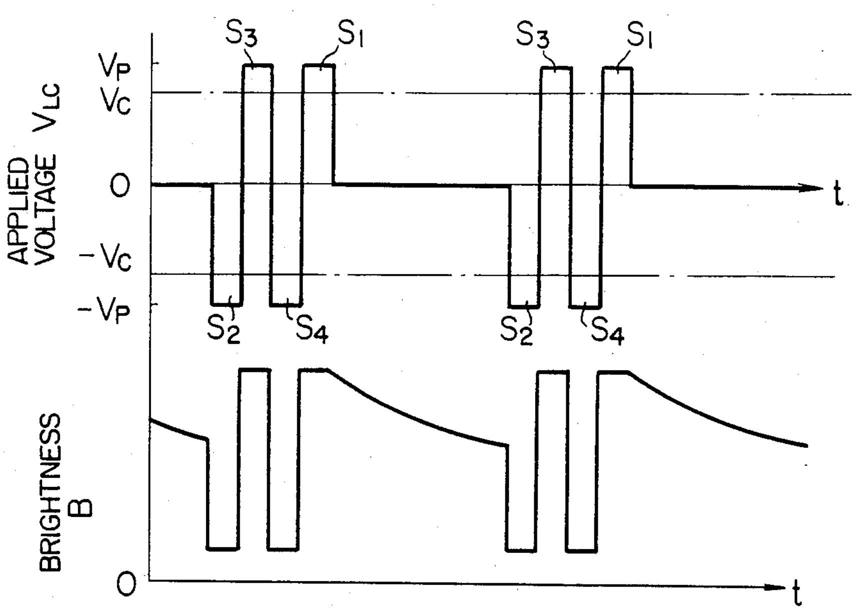
FIGS. 11a and 11b illustrate driving waveforms in accordance with a third embodiment of the present invention.
Figure 11B:
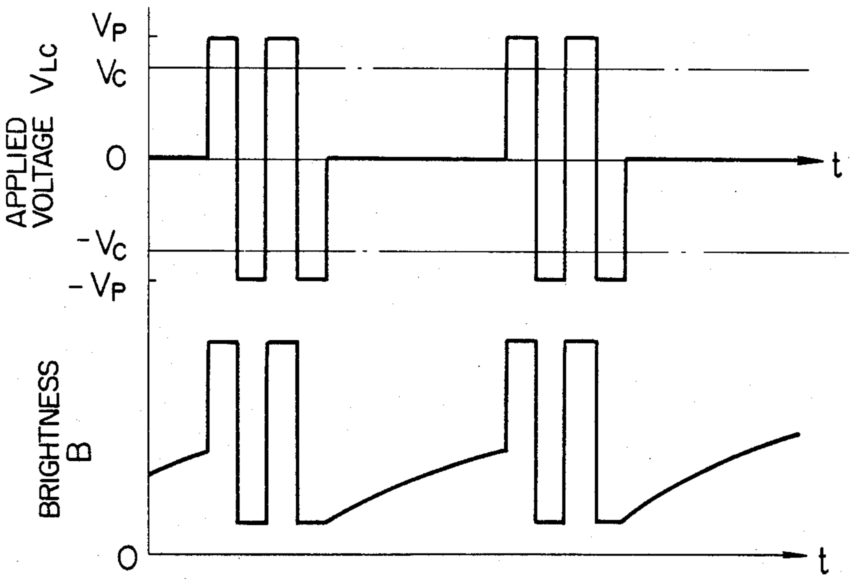

FIG. 11 shows drive waveforms according to a third embodiment of the present invention. FIGS. 11*a* and 11*b* correspond to the bright display and the dark display, respectively.

FIG. 11 as well, the DC component $S_1$ of the pulse voltage for defining the light transmitting state of a liquid crystal element has an opposite polarity and the same absolute value as compared with the DC component $(S_2+S_3+S_4)$ of other voltage signals as represented by equation (2).

$$S_1=-(S_2+S_3+S_4) \quad (2)$$

EMBODIMENT 4

Figure 12A:
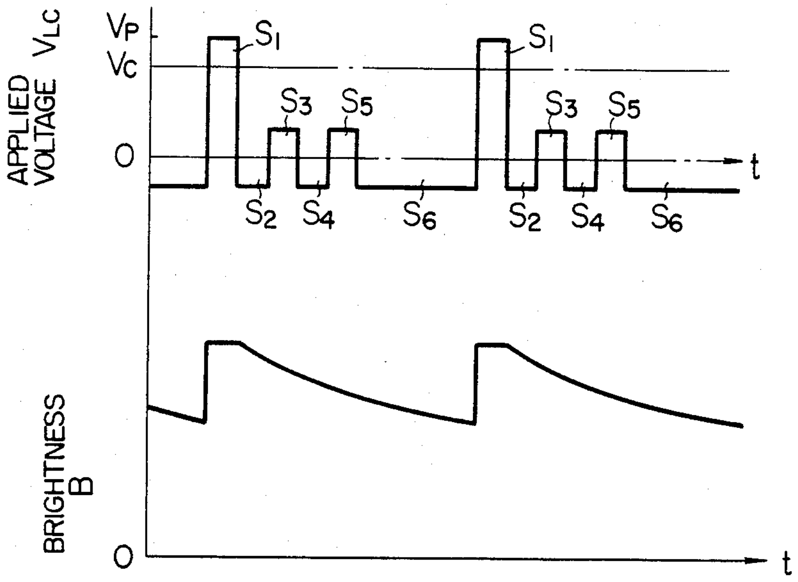
FIGS. 12a and 12b illustrate driving waveforms in accordance with a fourth embodiment of the present invention.
Figure 12B:
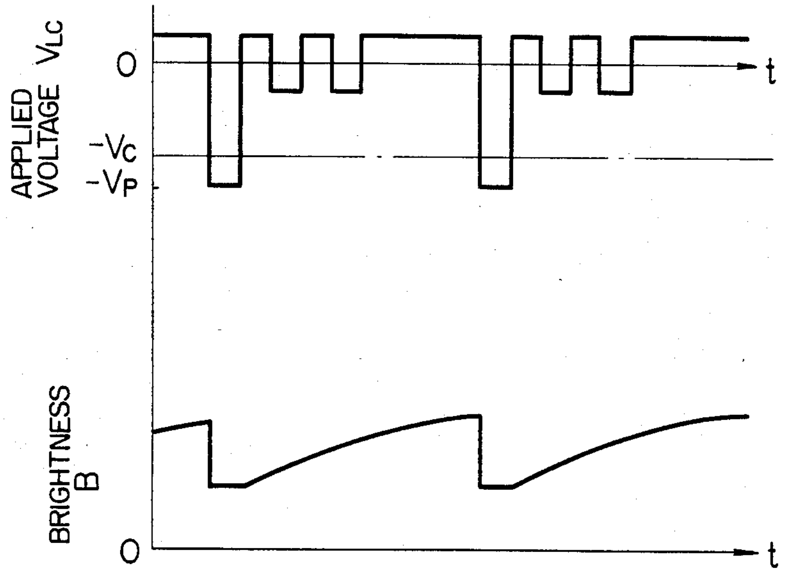

FIG. 12 shows driving waveforms according to a fourth embodiment of the present invention. FIGS. 12*a* and 12*b* correspond to the bright display and the dark display, respectively.

In FIG. 12 as well, the DC component $S_1$ of the pulse voltage for the light transmitting state of a liquid crystal element has an opposite polarity and the same absolute value as compared with the DC component $(S_2+S_3+S_4+S_5+S_6)$ of other voltage signals as represent by equation (3).

$$S_1=-(S_2+S_3+S_4+S_5+S_6) \quad (3)$$

EMBODIMENT 5

Figure 13A:
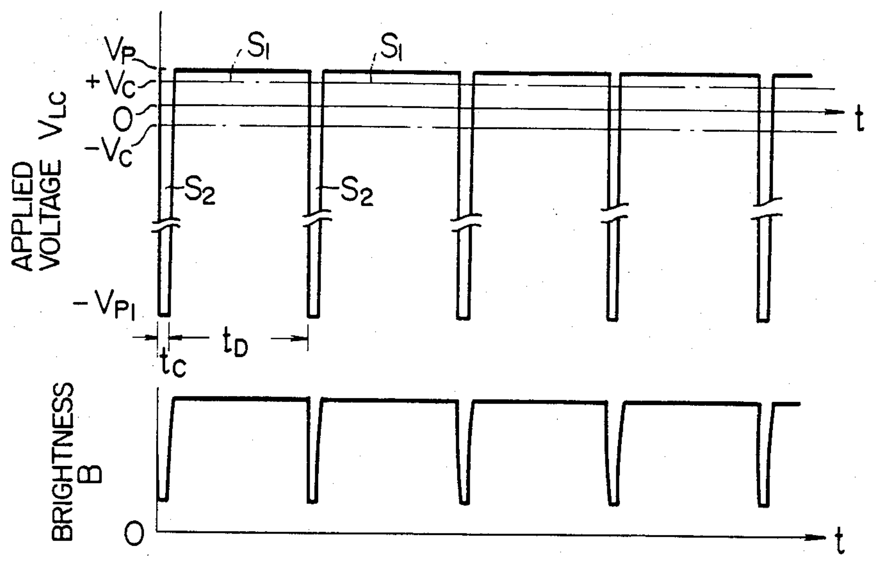
FIGS. 13a and 13b illustrate driving waveforms in accordance with a fifth embodiment of the present invention.
Figure 13B:
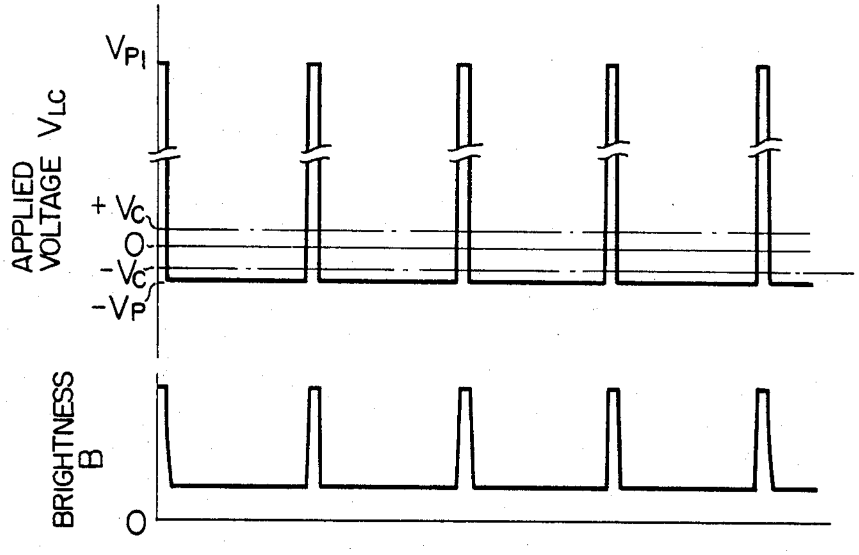

FIG. 13 shows driving waveforms according to a fifth embodiment of the present invention. FIGS. 13*a* and 13*b* correspond to the bright display and the dark display, respectively.

In FIG. 13 as well, the DC component $S_1$ of the pulse voltage for defining the light transmitting state of a liquid crystal element has an opposite polarity and the same absolute value as compared with the DC component $S_2$ of another voltage signal as represented by the equation (1).

Similar effects to those of the preceding embodiments can be obtained in this embodiment as well. In addition, a larger contrast ratio is obtained since the period $t_D$ during which the pulse voltage for defining the light transmitting state is applied is sufficiently long compared with the period during which the pulse voltage for eliminating the DC component is applied.

In the first to fifth embodiments of the present invention heretofore described, the polarization direction 31 of the polarizer 131 is made to coincide with the long axis direction of the ferroelectric liquid crystal molecule subjected to the electric field −E. The polarization direction 31 may coincide with the long axis direction of the ferroelectric liquid crystal molecule subjected to the electric field of +E. In this case, the bright display and the dark display are replaced with each other in the first to fifth embodiments.

In the first to fifth embodiments, a voltage signal for eliminating the DC component has been applied immediately before and/or after the application of the pulse voltage for defining the light transmitting state of the liquid crystal element. However, the application of such a voltage signal is not limited to the above described time sequence. The voltage signal for eliminating the DC component may be applied at any time within the period during which the pulse voltage for defining the light transmitting state is applied. The present invention may also be applied to the liquid crystal having a very long rescovery time $t_2'$ ($t_2'=\infty$). In this case, it is possible to define the light transmitting state by applying the pulse voltage one or more times only when the light transmitting state is to be changed. Thereby, the driving circuit may be simplified.

The embodiments of the present invention have been described in conjunction with the static drive. However, the present invention may also be applied to dynamic drive, such as line sequential scan or point sequential scan. Further, the present invention is not restricted to the DOBAMBC, but may be applied to other ferroelectric liquid crystals including those shown in Table 1.

As heretofore described, it becomes possible according to the present invention to obtain a driving method for a liquid crystal element in which the deterioration of a ferroelectric liquid crystal may be prevented and a desired light transmitting state may be rapidly attained.

We claim:

1. A method for driving a liquid crystal element including a ferroelectric liquid crystal interposed between a pair of substrates which have electrodes on their confronting surfaces, said method comprising:
   - a first step of applying to said ferroelectric liquid crystal a pulse voltage which defines the light transmitting state of said liquid crystal element; and
   - a second step of applying to said ferroelectric liquid crystal before and/or after said first step a voltage signal which renders the average value of voltages applied to said ferroelectric liquid crystal equal to zero.

2. A method according to claim 1, wherein the DC component of said voltage signal has an opposite polarity and the same absolute value as compared with said pulse voltage.

3. A method according to claim 2, wherein said voltage signal has an opposite polarity, the same pulse width and the same pulse height as compared with said pulse voltage.

4. A method according to claim 1, wherein the pulse height of said voltage signal is smaller than the threshold voltage of said ferroelectric liquid crystal.

5. A method according to claim 1, wherein a period during which said pulse voltage is applied is relatively longer than that during which said voltage signal is applied.

6. A method according to claim 1, wherein said ferroelectric liquid crystal includes one selected from a group consisting of chiral smectic C-phase liquid crystal and chiral smectic H-phase liquid crystal.

7. A method according to claim 1, wherein a dichroic dye is mixed into said ferroelectric liquid crystal.

8. A method according to claim 1, wherein a polarizer is placed adjacent to at least one of said substrates.

9. A method according to claim 8, wherein the polarization direction of said polarizer adjacent to one of said substrates is made to nearly coincide with the direction of the long molecular axis of said ferroelectric liquid crystal when an electric field exceeding the threshold voltage of said ferroelectric liquid crystal is applied.

* * * * *